US011343480B2

(12) United States Patent
Chien et al.

(10) Patent No.: US 11,343,480 B2
(45) Date of Patent: May 24, 2022

(54) PROJECTION POSITIONING SYSTEM AND PROJECTION POSITIONING METHOD THEREOF

(71) Applicant: Coretronic Corporation, Hsin-Chu (TW)

(72) Inventors: Chun-Lin Chien, Hsin-Chu (TW); Chung-Lung Yang, Hsin-Chu (TW); Yu-Kuan Chang, Hsin-Chu (TW); Pen-Ning Kuo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/228,718

(22) Filed: Apr. 13, 2021

(65) Prior Publication Data

US 2021/0409666 A1    Dec. 30, 2021

(30) Foreign Application Priority Data

Jun. 29, 2020 (CN) .......................... 202010606452.X (51) Int. Cl.
*H04N 9/31* (2006.01)
*G01J 1/42* (2006.01)
*G01J 3/50* (2006.01)

(52) U.S. Cl.
CPC .............. *H04N 9/3194* (2013.01); *G01J 1/42* (2013.01); *G01J 3/50* (2013.01); *H04N 9/3185* (2013.01)

(58) Field of Classification Search
CPC ....... H04N 9/3194; H04N 9/3185; G01J 1/42; G01J 3/50; G03B 21/147; G02B 26/10
See application file for complete search history.

(56) References Cited

U.S. PATENT DOCUMENTS 5,883,476 A * 3/1999 Noguchi .................. G09G 1/00
  348/181
10,958,883 B2 * 3/2021 Narikawa ............ H04N 9/3182
(Continued)

FOREIGN PATENT DOCUMENTS

CN      100388118      5/2008
CN      101208738     11/2011
(Continued)

*Primary Examiner* — John W Miller
*Assistant Examiner* — Humam M Satti
(74) *Attorney, Agent, or Firm* — JCIPRNET (57) ABSTRACT

A projection positioning system and a projection positioning method thereof are provided. A projection device projects a first test image and a second test image on a projection screen based on a projection range at different time points. At least one photosensitive element is disposed on the projection screen. In response to projecting the first test image, a computing device divides a first image sub-zone of the first test image according to the first image sub-zone corresponding to one of first optical parameters sensed by the photosensitive element, to generate the second test image. In response to projecting the second test image, the computing device determines positioning information of the photosensitive element with respect to the projection range according to a second image sub-zone corresponding to one of second optical parameters sensed by the photosensitive element. The projection device performs a projection adjustment function according to the positioning information.

20 Claims, 6 Drawing Sheets

(56) References Cited

U.S. PATENT DOCUMENTS

| | | | | |
|---|---|---|---|---|
| 2003/0214610 A1* | 11/2003 | George | ............... | H04N 9/28 |
| | | | | 348/E5.12 |
| 2006/0017890 A1* | 1/2006 | Inazumi | ............... | H04N 9/3185 |
| | | | | 353/69 |
| 2015/0261383 A1* | 9/2015 | Lee | ............... | G06F 3/042 |
| | | | | 345/175 |
| 2017/0353703 A1* | 12/2017 | Guo | ............... | H04N 9/3179 |
| 2020/0389632 A1* | 12/2020 | Chien | ............... | H04N 9/3194 |

FOREIGN PATENT DOCUMENTS

| | | | |
|---|---|---|---|
| CN | 101630213 B | * | 7/2013 |
| CN | 103488348 | | 9/2016 |
| CN | 105072430 | | 10/2017 |
| JP | 2015191484 | | 11/2015 |
| TW | 201250368 | | 12/2012 |

* cited by examiner

PROJECTION POSITIONING SYSTEM AND PROJECTION POSITIONING METHOD THEREOF

CROSS-REFERENCE TO RELATED APPLICATION

This application claims the priority benefit of China application serial no. 202010606452.X, filed on Jun. 29, 2020. The entirety of the above-mentioned patent application is hereby incorporated by reference herein and made a part of this specification.

BACKGROUND OF THE INVENTION

1. Field of the Invention

The invention relates to a projection technology, and in particular, to a projection positioning system and a projection positioning method thereof.

2. Description of Related Art

A projector is a display device for generating large-size images. An imaging principle of the projector is to convert an illumination beam generated by a light source module into an image beam through a light valve device, and then project the image beam on a projection screen or a wall through a lens to form an image. With the advancement of a projection technology and the reduction of manufacturing costs, the projector is applied to various applications. In some applications, a boundary or a projection position of a projection image needs to be adjusted according to requirements of a projection environment. For example, in a touch projection system, a user needs to align and correct the projection image of the projector and a touch zone provided by the projection screen, so that the projector can correctly respond to a touch operation received by the touch projection screen to perform a subsequent action, and the user can smoothly interact with the touch projection system. In detail, a touch boundary of the touch zone on the projection screen needs to be accurately aligned with an image content boundary in the projection image, so that the touch projection system can accurately provide a function that meets the user's expectation for a touch position of the touch operation.

In a traditional correction method, the projection system can position a target projection position by shooting a projection result through a camera, but a camera parameter and camera correction together needs to be considered in this method. Otherwise, the target projection boundary cannot be accurately positioned. Alternatively, in another traditional correction method, the user can manually control movement of the image content boundary in the projection image to position the target projection position. However, steps of the manual operation in this manner are cumbersome and time-consuming, which is quite inconvenient for the user.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

In view of the above, the invention provides a projection positioning system and a projection positioning method thereof, to efficiently and accurately position image content in a projection image at a position defined by a photosensitive element.

An embodiment of the invention provides a projection positioning system, including a projection device, at least one photosensitive element, and a computing device. The projection device projects a first test image and a second test image on a projection screen based on a projection range at different time points. The at least one photosensitive element is disposed on the projection screen. The computing device is coupled to the at least one photosensitive element and the projection device. The first test image includes a plurality of first image sub-zones and the first image sub-zones respectively correspond to a plurality of first optical parameters. The second test image includes a plurality of second image sub-zones and the second image sub-zones respectively correspond to a plurality of second optical parameters. In response to projecting the first test image by the projection device, the computing device divides the first image sub-zone according to the first image sub-zone corresponding to one of the first optical parameters sensed by the at least one photosensitive element, to generate the second test image. In response to projecting the second test image by the projection device, the computing device determines positioning information of the at least one photosensitive element with respect to the projection range according to the second image sub-zone corresponding to one of the second optical parameters sensed by the at least one photosensitive element. The projection device performs a projection adjustment function according to the positioning information.

According to an embodiment, in the above projection positioning system, the projection adjustment function performed by the projection device according to the positioning information of the at least one photosensitive element is to perform projection within a specific enclosed range surrounded by the at least one photosensitive element on the projection screen, and the number of the at least one photosensitive element is greater than 1.

According to an embodiment, in the above projection positioning system, the projection adjustment function performed by the projection device according to the positioning information of the at least one photosensitive element is to project a specific totem on a position of the at least one photosensitive element.

According to an embodiment, in the above projection positioning system, sizes of the second image sub-zones are smaller than sizes of the first image sub-zone.

According to an embodiment, in the above projection positioning system, in response to determining, by the computing device, that the sizes of the second image sub-zones conform to a minimum division unit, the computing device determines the positioning information of the at least one photosensitive element with respect to the projection range.

According to an embodiment, in the above projection positioning system, the first image sub-zones and the second image sub-zones are respectively arranged in a matrix, and the positioning information includes a first positioning position in a first axial direction and a second positioning position in a second axial direction.

According to an embodiment, in the above projection positioning system, the first optical parameters and the second optical parameters include a color sensing value or a brightness sensing value, and the at least one photosensitive element includes a color sensor or a brightness sensor.

According to an embodiment, in the above projection positioning system, in response to projecting the first test image by the projection device, one of the first image sub-zones overlaps the at least one photosensitive element, and the at least one photosensitive element senses one of the first optical parameters corresponding to one of the first image sub-zones.

According to an embodiment, in the above projection positioning system, in response to projecting the second test image by the projection device, one of the second image sub-zones overlaps the at least one photosensitive element, the at least one photosensitive element senses one of the second optical parameters corresponding to one of the second image sub-zones, and the computing device determines the positioning information of the at least one photosensitive element with respect to the projection range according to position information of one of the second image sub-zones in the second test image.

According to an embodiment, in the above projection positioning system, the projection device further projects a plurality of preset correction images respectively corresponding to a plurality of colors, and the at least one photosensitive element sequentially senses a plurality of correction sensing values when the projection device is projecting the preset correction images, and obtains a sensing correction function according to the correction sensing values, where the sensing correction function is used to convert actual sensing values of the at least one photosensitive element into the first optical parameters and the second optical parameters.

An embodiment of the invention provides a projection positioning method, including the following steps. A first test image is projected by a projection device on a projection screen based on a projection range. The first test image includes a plurality of first image sub-zones and the first image sub-zones respectively correspond to a plurality of first optical parameters. The first image sub-zone is divided according to the first image sub-zone corresponding to one of the first optical parameters sensed by the at least one photosensitive element, in response to the first test image projected by the projection device, parameter, to generate the second test image. The second test image is projected by the projection device on the projection screen based on the projection range. The second test image includes a plurality of second image sub-zones and the second image sub-zones respectively correspond to a plurality of second optical parameters. Positioning information of the at least one photosensitive element with respect to the projection range is determined according to the second image sub-zone corresponding to one of the second optical parameters sensed by the at least one photosensitive element, in response to the second test image projected by the projection device. A projection adjustment function is performed according to the positioning information.

According to an embodiment, in the above projection positioning method, the step of performing a projection adjustment function according to the positioning information includes the following step. Projection within a specific enclosed range surrounded by the at least one photosensitive element on the projection screen is performed by the projection device according to the positioning information of the at least one photosensitive element, and the number of the at least one photosensitive element is greater than 1.

According to an embodiment, in the above projection positioning method, the step of performing a projection adjustment function according to the positioning information includes the following step. A specific totem on a position of the at least one photosensitive element is projected by the projection device according to the positioning information of the at least one photosensitive element.

According to an embodiment, in the above projection positioning method, sizes of the second image sub-zones are smaller than sizes of the first image sub-zone.

According to an embodiment, in the above projection positioning method, the step of determining, in response to projecting the second test image by the projection device, positioning information of the at least one photosensitive element with respect to the projection range according to the second sub-image corresponding to one of the second optical parameters sensed by the at least one photosensitive element includes the following step. The positioning information of the at least one photosensitive element with respect to the projection range is determined in response to determining that the sizes of the second image sub-zones conform to a minimum division unit.

According to an embodiment, in the above projection positioning method, the first image sub-zones and the second image sub-zones are respectively arranged in a matrix, and the positioning information includes a first positioning position in a first axial direction and a second positioning position in a second axial direction.

According to an embodiment, in the above projection positioning method, the first optical parameters and the second optical parameters include a color sensing value or a brightness sensing value, and the at least one photosensitive element includes a color sensor or a brightness sensor.

According to an embodiment, in the above projection positioning method, in response to projecting the first test image by the projection device, one of the first image sub-zones overlaps the at least one photosensitive element, and the at least one photosensitive element senses one of the first optical parameters corresponding to one of the first image sub-zones.

According to an embodiment, in the above projection positioning method, in response to projecting the second test image by the projection device, one of the second image sub-zones overlaps the at least one photosensitive element, and the at least one photosensitive element senses one of the second optical parameters corresponding to one of the second image sub-zones; and the step of determining the positioning information of the at least one photosensitive element with respect to the projection range includes the following step. The positioning information of the at least one photosensitive element with respect to the projection range is determined according to position information of one of the second image sub-zones in the second test image.

According to an embodiment, in the above projection positioning method, the method further includes the following steps. A plurality of preset correction images respectively corresponding to a plurality of colors are projected by a projection device. A plurality of correction sensing values when the preset correction images are being projected are sequentially sensed by the at least one photosensitive element to obtain a sensing correction function according to the correction sensing values. The sensing correction function is used to convert actual sensing values of the at least one photosensitive element into the first optical parameters and the second optical parameters.

Based on the above, in the embodiments of the invention, the projection device projects a plurality of test images on the projection screen at different time points, and the test images each include a plurality of image sub-zones corresponding to different optical parameters. Positions and sizes of the image sub-zones in these test images change as the test images are switched. When the projection device sequentially projects these test images on the projection screen, the photosensitive elements disposed on the projection screen sequentially sense optical parameters corresponding to an image sub-zone in each test image. Herein, the projection positioning system determines a position of an image sub-zone in a next test image according to a sensing result of the photosensitive element for a current test image. Because the positions and sizes of the image sub-zones change as the test images are switched, the positioning information of the photosensitive element with respect to the projection range can be obtained according to the sensed optical parameter, to adjust projection content according to the positioning information of the photosensitive element. In this way, an efficient and convenient projection positioning method can be provided, thereby greatly improving the operation convenience of the projection device.

Other objectives, features and advantages of the present invention will be further understood from the further technological features disclosed by the embodiments of the present invention wherein there are shown and described preferred embodiments of this invention, simply by way of illustration of modes best suited to carry out the invention.

In order to make the foregoing features and advantages of the invention more apparent and easier to understand, detailed description are provided below by listing embodiments with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Some embodiments of the invention are described below in detail with reference to the accompanying drawings. Reference numerals referenced in the following description are regarded as identical or similar elements when identical reference numerals appear in different drawings. The embodiments are merely some of the embodiments of the invention, and do not disclose all the implementations of the invention. More precisely, the embodiments are merely examples of the system and method in the claims of the invention.

Figure 1:
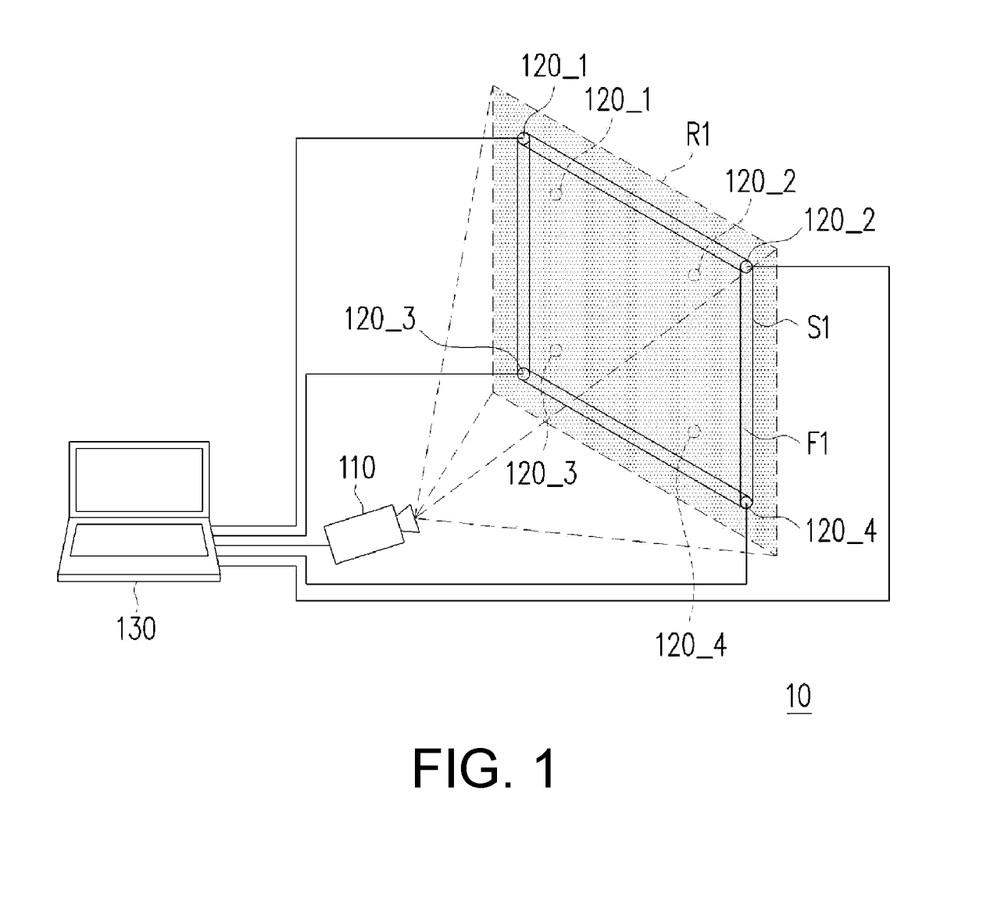
FIG. 1 is a schematic diagram of a projection positioning system according to an embodiment of the invention.

FIG. 1 is a schematic diagram of a projection positioning system according to an embodiment of the invention. Referring to FIG. 1, a projection positioning system 10 includes a projection device 110, at least one photosensitive element, a projection screen S1, and a computing device 130. An example in which four photosensitive elements 120_1-120_4 are disposed is used for description below, or only one photosensitive element may be disposed.

The projection device 110 may project an image on the projection screen S1, and may be a liquid crystal projector (LCP), a digital light processing (DLP) projector, a liquid crystal on silicon (LCOS) projection display device, or the like. In the embodiment, the projection device 110 may further include a light source module, an optomechanical module, a lens module, a related optical element, a circuit control element, and the like. For example, the projection device 110 may further include an image processing circuit for performing image processing. In an embodiment, the projection device 110 may sequentially project a plurality of test images (a first test image and a second test image) on the projection screen S1 based on a projection range R1 at different time points. The projection range R1 depends on factors such as a distance between the projection device 110 and the projection screen S1, a projection direction of the projection device 110, and an optical characteristic of an internal optical element.

The projection screen S1 is configured to display a projection image projected by the projection device 110. In an embodiment, the projection screen S1 has a frame F1. In an embodiment, the touch-type projection screen S1 may include a frame F1 and a touch panel embedded in the frame F1. The touch-type projection screen S1 may display the projection image according to an image beam projected by the projection device 110 and detect a touch operation issued by a user. Alternatively, in an embodiment, the projection screen S1 may include a frame F1 and other display media embedded in the frame F1 and having no touch function, such as a projection screen or a whiteboard embedded in the frame F1 and formed by the frame F1. However, although FIG. 1 illustrates the projection screen S1 including the frame F1 as an example, the invention is not limited thereto. In other embodiments, the projection screen S1 may not include a frame.

The photosensitive elements 120_1-120_4 are disposed on the projection screen S1. The photosensitive elements 120_1-120_4 may be configured to sense an optical parameter of the projection image. The photosensitive elements 120_1-120_4 may include a color sensor or a brightness sensor. The photosensitive elements 120_1-120_4 may be, for example, a charge coupled device (CCD), a complementary metal-oxide semiconductor (CMOS) device, or other devices. In an embodiment, the photosensitive elements 120_1-120_4 are respectively located at a plurality of corners of the frame F1 of the projection screen S1, and the projection range R1 of the projection device 110 at least covers the frame F1. Alternatively, in other embodiments, the photosensitive elements 120_1-120_4 may be respectively located at a plurality of specific positions within the frame F1 of the projection screen S1, and the projection range R1 of the projection device 110 covers the photosensitive elements 120_1-120_4 on the projection screen S1.

However, it should be noted that in FIG. 1, there are four photosensitive elements 120_1-120_4 and the photosensitive elements are respectively located at four corners of the frame F1 of the projection screen S1. However, the number and disposing positions of the photosensitive elements are not limited in the invention, and may be set according to actual requirements. For example, the number of photosensitive elements may be other numbers, such as 1, 2, or 8. In an embodiment, in order to obtain a rectangular boundary defined by the frame F1 according to a sensing result generated by the photosensitive element, there are at least two photosensitive elements and the photosensitive elements are respectively located at two corners of a diagonal line of the frame F1. In an embodiment, in order to project a specific pattern to a specific position in the projection image, there is at least one photosensitive element.

The computing device 130 is coupled to the projection device 110 and the plurality of photosensitive elements 120_1-120_4, and includes a memory and at least one processor coupled to the memory. The computing device 130 may be a computer control system with a computing capability, such as a desktop computer, a notebook computer, a work station, an industrial computer, or a server host. The memory may be any type of non-transitory, volatile, and non-volatile data storage device, and is configured to store buffered data, permanent data, and compiled code for performing a function of the computing device 130. The processor may be a field programmable gate array (FPGA), a programmable logic device (PLD), an application-specific integrated circuit (ASIC), or other similar devices or a combination of these devices. The processor may be a central processing unit (CPU), a programmable general-purpose or special-purpose microprocessor (microprocessor), a digital signal processor (DSP), a graphics processing unit (GPU), other similar devices or a combination of these devices.

In an embodiment, the projection device 110 is controlled to project a plurality of designed test images and the photosensitive elements 120_1-120_4 are disposed on the projection screen S1 for sensing, and the computing device 130 may obtain positioning information of the photosensitive elements 120_1-120_4 in the projection range R1 according to sensing results reported by the photosensitive elements 120_1-120_4. In this way, the projection device 110 may perform a projection adjustment function according to the positioning information of the photosensitive elements 120_1-120_4, such as aligning a boundary of projection content with the frame F1 or projecting a specific totem on a specific position. Examples will be listed below for detailed description.

Figure 2:
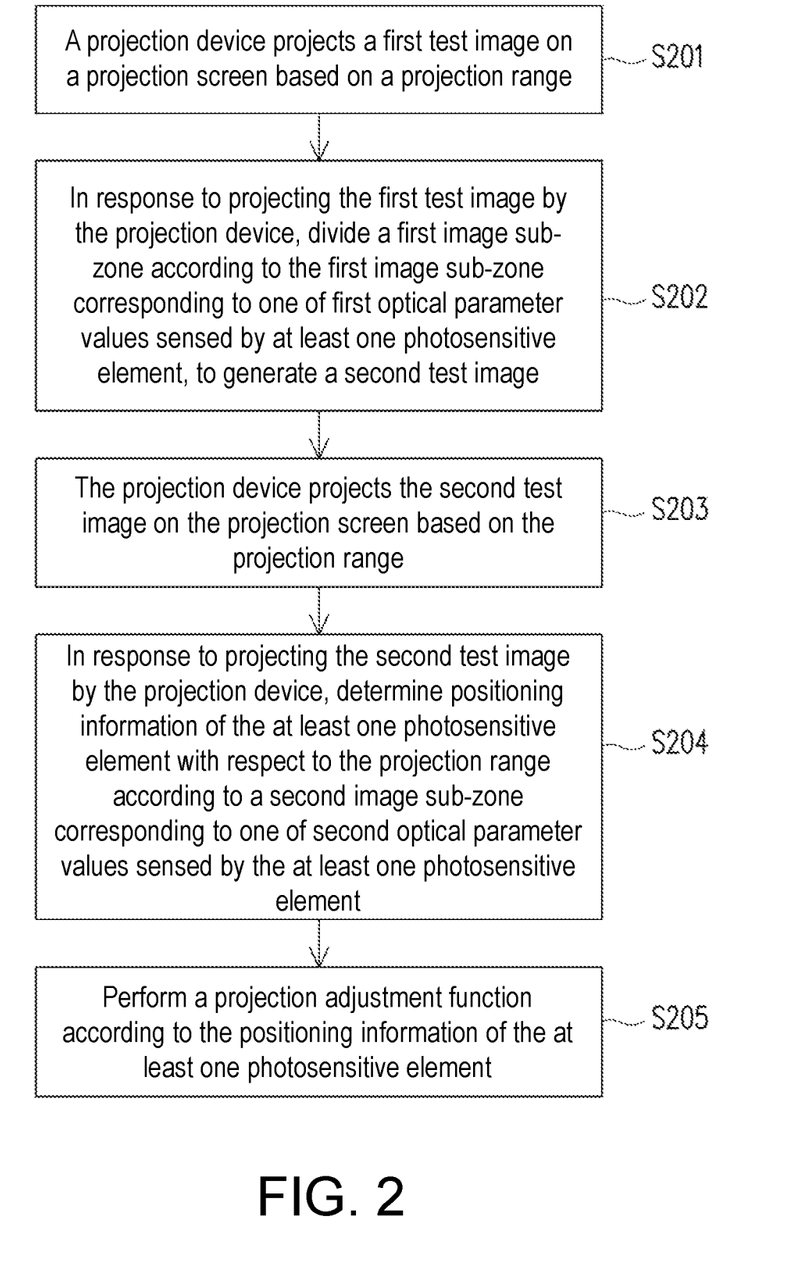
FIG. 2 is a flowchart of a projection positioning method according to an embodiment of the invention.

FIG. 2 is a flowchart of a projection positioning method according to an embodiment of the invention. The procedure of the method in FIG. 2 may be implemented by each element of the projection positioning system 10 in FIG. 1. Referring to both FIG. 1 and FIG. 2, steps of the projection positioning method in the embodiment are described below with the elements of the projection positioning system 10 in FIG. 1.

It should be noted that the projection device 110 may project a first test image and a second test image on the projection screen S1 at different time points. The first test image includes a plurality of first image sub-zones corresponding to different first optical parameters, and the second test image includes a plurality of second image sub-zones corresponding to a plurality of second optical parameter. The first optical parameter and the second optical parameter may include a color sensing value or a brightness sensing value. For example, the first optical parameter and the second optical parameter may be a grayscale value or a color channel value (for example, an RGB channel value). When the photosensitive elements 120_1-120_4 are color sensors, the first optical parameter and the second optical parameter are color sensing values. When the photosensitive elements 120_1-120_4 are brightness sensors, the first optical parameter and the second optical parameter are brightness sensing values. Herein, the plurality of second image sub-zones in the second test image are generated by selecting one of the first image sub-zones for division, and the computing device 130 may determine the divided first image sub-zone according to sensing results of the photosensitive elements 120_1-120_4. For clarity, the following procedure in FIG. 2 takes positioning of the photosensitive element 120_1 first as an example.

In step S201, the projection device 110 projects the first test image on the projection screen S1 based on a projection range R1. The projection device 110 projects an image beam on the projection screen S1, and the first test image projected by the projection device 110 in the projection range R1 covers the photosensitive element 120_1. In addition, the first test image includes the plurality of first image sub-zones, the first image sub-zones respectively correspond to a plurality of first optical parameters, and the first optical parameters are different from each other.

Figure 3A:
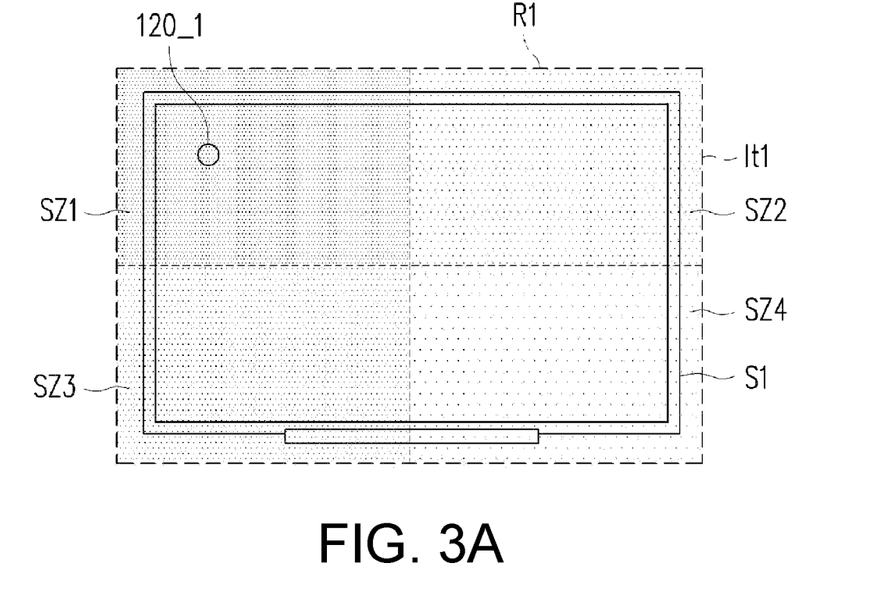
FIG. 3A is an example of a first test image according to an embodiment of the invention.

For example, FIG. 3A is an example of a first test image according to an embodiment of the invention. Referring to FIG. 3A, a first test image It1 may be a grayscale image or a color image, and may include four first image sub-zones SZ1-SZ4. The first image sub-zones SZ1-SZ4 may be arranged in a matrix, that is, four rectangular blocks arranged in a matrix of two columns and two rows (2×2). The first image sub-zones SZ1-SZ4 respectively correspond to different first optical parameters. In detail, the first test image It1 may include four the first image sub-zones SZ1-SZ4 respectively corresponding to four colors or four grayscale values. For example, the first image sub-zone SZ1 may correspond to an RGB channel value (0, 0, 0) and be presented as a black block. The first image sub-zone SZ2 may correspond to an RGB channel value (255, 0, 0) and be presented as a red block. The first image sub-zone SZ3 may correspond to an RGB channel value (0, 255, 0) and be presented as a green block. The first image sub-zone SZ4 may correspond to an RGB channel value (0, 0, 255) and be presented as a blue block. Alternatively, the first image sub-zones SZ1-SZ4 may respectively correspond to different four grayscale values and be presented as four grayscale blocks with different depths.

It should be noted that in FIG. 3A, in response to projecting the first test image It1 on the projection screen S1 by the projection device 110, one (the first image sub-zone SZ1) of the first image sub-zones SZ1-SZ4 overlaps the photosensitive element 120_1, and the photosensitive element 120_1 senses one of the first optical parameters corresponding to one (the first image sub-zone SZ1) of the first image sub-zones SZ1-SZ4. For example, assuming that the first image sub-zone SZ1 corresponds to the RGB channel value (0, 0, 0) and is presented as a black block, the first optical parameter sensed by the photosensitive element 120_1 is the RGB channel value (0, 0, 0).

However, the first test image It1 in FIG. 3A is only an exemplary description, and is not intended to limit the invention. The number and arrangement manners of the first image sub-zones and respective corresponding first optical parameters may be configured according to actual requirements. For example, in other embodiments, the first test image It1 may include nine first image sub-zones arranged in a matrix of three columns and three rows (3×3), or the first test image It1 may include two first image sub-zones arranged in a matrix of one column and two rows (1×2).

In step S202, in response to projecting the first test image by the projection device 110, the computing device 130 divides the first image sub-zone according to the first image sub-zone corresponding to one of the first optical parameters sensed by the photosensitive element 120_1, to generate the second test image. In detail, when the projection device 110 projects the first test image, because the photosensitive element 120_1 is located in one of the first image sub-zones, the photosensitive element 120_1 may sense the first optical parameter corresponding to one of the first image sub-zones. In other words, according to the optical parameter sensed by the photosensitive element 120_1, the computing device 130 may select the first image sub-zone corresponding to the photosensitive element 120_1 for division to generate the second test image. The computing device 130 divides the first image sub-zone corresponding to the photosensitive element 120_1 to generate the plurality of second image sub-zones in the second test image. It can be learned that a range of the second image sub-zones in the second test image corresponds to a range of the first image sub-zones in the first test image corresponding to the photosensitive element 120_1, the second test image also includes the plurality of second image sub-zones, and these second image sub-zones respectively correspond to a plurality of second optical parameters.

Figure 3B:
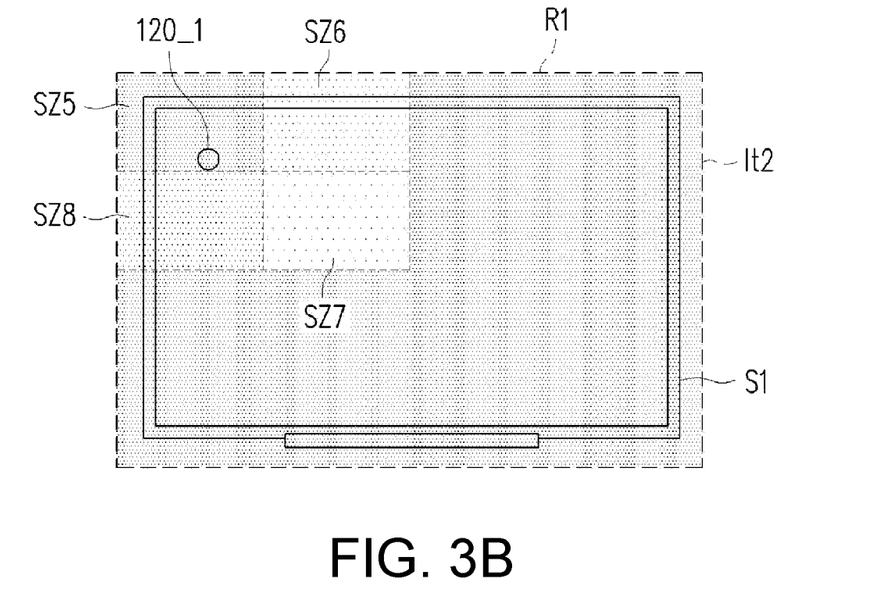
FIG. 3B is an example of a second test image according to the embodiment of FIG. 3A.

For example, FIG. 3B is an example of a second test image according to the embodiment of FIG. 3A. Referring to FIG. 3A and FIG. 3B, in response to sensing the first optical parameter corresponding to the first image sub-zone SZ1 by the sensing element 120_1, the computing device 130 divides the first image sub-zone SZ1 to generate a second test image It2. Referring to FIG. 3B, the second test image It2 may be a grayscale image or a color image and may include four second image sub-zones SZ5-SZ8, and a range of the four second image sub-zones SZ5-SZ8 corresponds to a range of the first image sub-zone SZ1 in the first test image It1. The second image sub-zones SZ5-SZ8 may be arranged in a matrix, that is, four rectangular blocks arranged in a 2×2 matrix. The second image sub-zones SZ5-SZ8 correspond to different second optical parameters, that is, the second test image It2 may include four second image sub-zones SZ5-SZ8 respectively corresponding to four colors or four grayscale values. In other words, the computing device 130 divides the first image sub-zone SZ1 to generate the four second image sub-zones SZ5-SZ8 in the second test image It2. Sizes of the second image sub-zones SZ5-SZ8 in the second test image It2 are smaller than sizes of the first image sub-zones SZ1-SZ4 in the first test image It1. In this example, assuming that the sizes of the first image sub-zones SZ1-SZ4 are M×N (unit pixels), the sizes of the second image sub-zones SZ5-SZ8 are M/2×N/2.

However, the second test image It2 in FIG. 3B is only an exemplary description, and is not intended to limit the invention. The number and arrangement manners of the second image sub-zones and respective corresponding second optical parameters may be configured according to actual requirements. In addition, the number of second image sub-zones in the second test image may be the same or different from that of the first image sub-zones in the first test image, which is not limited in the invention. In addition, the second optical parameter corresponding to the second image sub-zone may be the same or different from the first optical parameter corresponding to the first image sub-zone, which is not limited in the invention.

In step S203, the projection device 110 projects the second test image on the projection screen S1 based on the projection range R1. Then, in step S204, in response to projecting the second test image on the projection screen S1 by the projection device 110, the computing device 130 determines positioning information of the photosensitive element 120_1 with respect to the projection range according to the second image sub-zone corresponding to one of the second optical parameters sensed by the at least one photosensitive element 120_1. For example, referring to FIG. 3B, in response to projecting the second test image It2 by the projection device 110, one (the second image sub-zone SZ5) of the second image sub-zones SZ5-SZ8 overlaps the photosensitive element 120_1, the photosensitive element 120_1 senses one of the second optical parameters corresponding to one (the second image sub-zone SZ5) of the second image sub-zones SZ5-SZ8, and the computing device 130 may determine the positioning information of the photosensitive element 120_1 with respect to the projection range R1 according to position information of one (the second image sub-zone SZ5) of the second image sub-zones SZ5-SZ8 in the second test image It2.

Based on this, according to the second optical parameter sensed by the photosensitive element 120_1 when the projection device 110 projects the second test image It2, the computing device 130 may determine that the photosensitive element 120_1 is located in a specified second image sub-zone, and then position the photosensitive element 120_1 according to pixel position information of the second image sub-zone. The computing device 130 may determine the positioning information of the photosensitive element 120_1 according to pixel position information in a specified second image sub-zone. It can be learned that if a size of the second image sub-zone is smaller, the computing device 130 can obtain a more accurate positioning result. The positioning information of the photosensitive element 120_1 may include a pixel coordinate or a positioning zone.

In an embodiment, the computing device 130 may repeatedly divide an image sub-zone to generate a next test image to more accurately obtain a positioning result of the photosensitive element 120_1 with respect to the projection range according to a smaller image sub-zone. Therefore, in an embodiment, the computing device 130 may determine whether the size of the second image sub-zone conforms to a minimum division unit, and the minimum division unit is, for example, 1×1 pixel or a×b pixels. In response to determining, by the computing device 130, that the size of the second image sub-zone meets a minimum division unit, the computing device 130 may determine the positioning information of the photosensitive element 120_1 with respect to the projection range R1 according to a sensing result of the photosensitive element 120_1. For example, when the size of the second image sub-zone is a×b pixels, the computing device 130 may use one pixel position in the second image sub-zone corresponding to the sensing result as the positioning information of the photosensitive element 120_1. Alternatively, when the size of the second image sub-zone is 1×1 pixel, the computing device 130 may use a unique pixel position in the second image sub-zone corresponding to the sensing result as the positioning information of the photosensitive element 120_1. Alternatively, when the size of the second image sub-zone is a×b pixels, the computing device 130 may statistically compute the positioning information of the photosensitive element 120_1 according to four pixel positions at four corners of the second image sub-zone corresponding to the sensing result.

It should be noted that, based on the same principle and process, the computing device 130 may also obtain positioning information of other photosensitive elements 120_2 to 120_4. Finally, in step S205, the projection device 110 performs a projection adjustment function according to the positioning information of the one or more photosensitive elements 120_1-120_4. In other words, the projection device 110 may adjust projection content or a projection parameter according to the positioning information of the photosensitive elements 120_1-120_4. In an embodiment, the projection adjustment function performed by the projection device 110 according to the positioning information of the photosensitive elements 120_1-120_4 is to perform projection within a specific enclosed range surrounded by the photosensitive elements 120_1-120_4 on the projection screen S1. Based on this, when the photosensitive elements 120_1-120_4 are disposed on four corner of the frame F1, the projection device 110 may obtain an ideal display boundary defined by the frame F1 in the projection range R1 according to the positioning information of the photosensitive elements 120_1-120_4, and adjust projection content (for example, image zoom processing or keystone correction) accordingly, so that the projection content can be aligned with the frame F1.

It should be noted that in FIG. 1, for example, the photosensitive elements 120_1-120_4 are arranged in a rectangle. Therefore, the projection device 110 may perform projection within a rectangular range according to the positioning information of the photosensitive elements 120_1-120_4. In other embodiments, assuming that the plurality of photosensitive elements are arranged in an octagonal shape, the projection device 110 may perform projection within an octagonal range according to positioning information of eight photosensitive elements.

Alternatively, in an embodiment, the projection adjustment function performed by the projection device 110 according to positioning information of the single photosensitive element 120_1 is to project a specific totem on a position of the photosensitive element 120_1. For example, a user may dispose one photosensitive element at a specific position on the projection screen S1, and after the computing device 130 obtains the positioning information of the photosensitive element, the projection device 110 may anchor and project a manufacturer logo, an advertising logo, or other preset totems according to positioning position of the photosensitive element, that is, the specific totem in the image projected by the projection device 10 covers the photosensitive element.

Based on the above description, it can be learned that positions and sizes of image sub-zones in a plurality of test images projected by the projection device 110 vary. In other words, when the projection device 110 projects the second test image after projecting the first test image, positions and sizes of a plurality of image sub-zones corresponding to different optical parameters change. For example, sizes of the four first image sub-zones SZ1-SZ4 in the first test image It1 of FIG. 3A are respectively a quarter of the first test image It1, and sizes of the four second image sub-zones SZ5-SZ8 in the first test image It2 of FIG. 3B are respectively quarters of corresponding first image sub-zones. However, the invention is not limited thereto. By gradually reducing a size of an image sub-zone in each test image and adjusting a position of the image sub-zone, the computing device 130 may obtain the positioning information of the photosensitive element according to the optical parameter sensed by the photosensitive element.

Figure 4A:
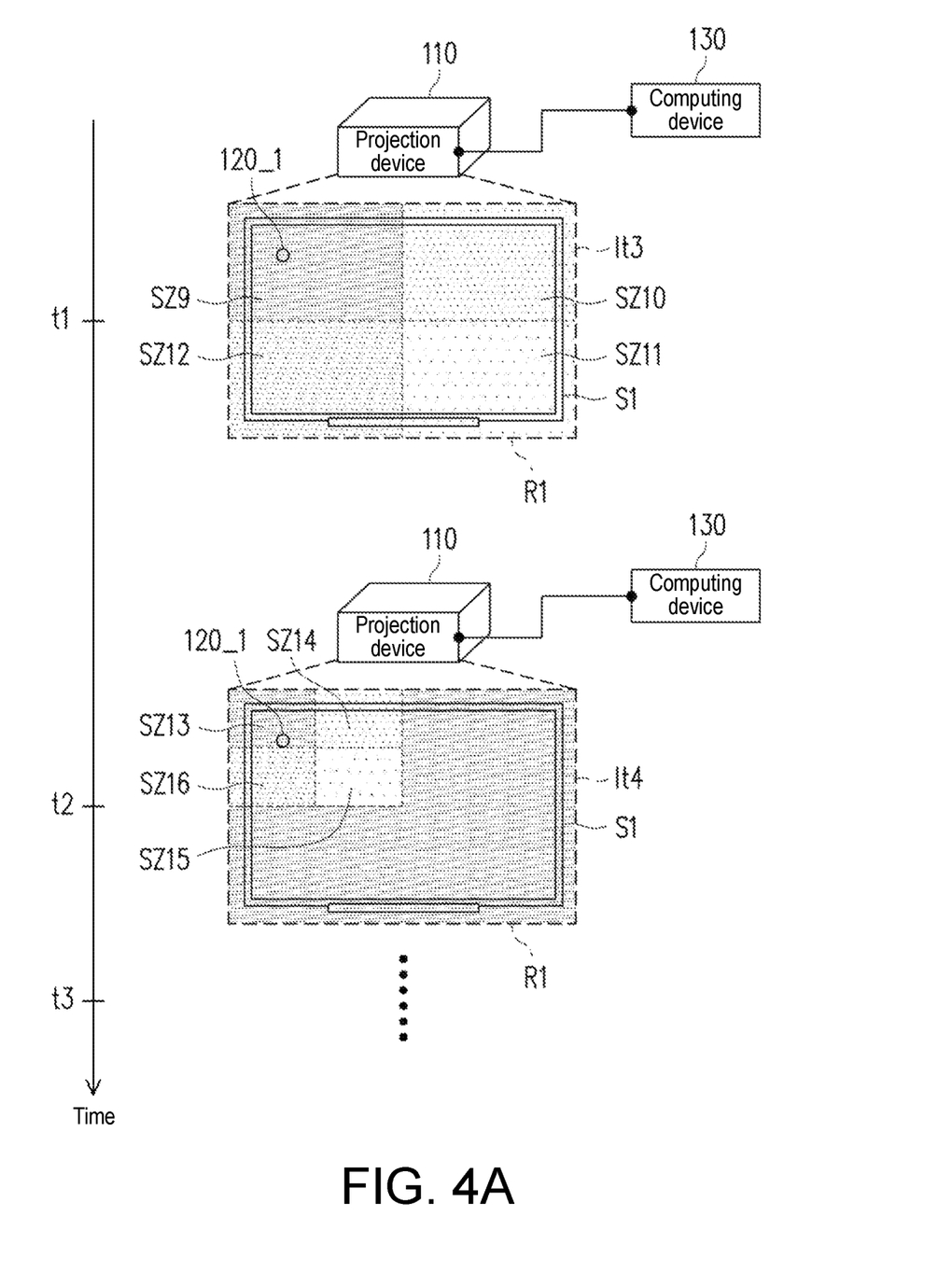
FIG. 4A and FIG. 4B are schematic diagrams of a projection positioning method according to an embodiment of the invention.
Figure 4B:
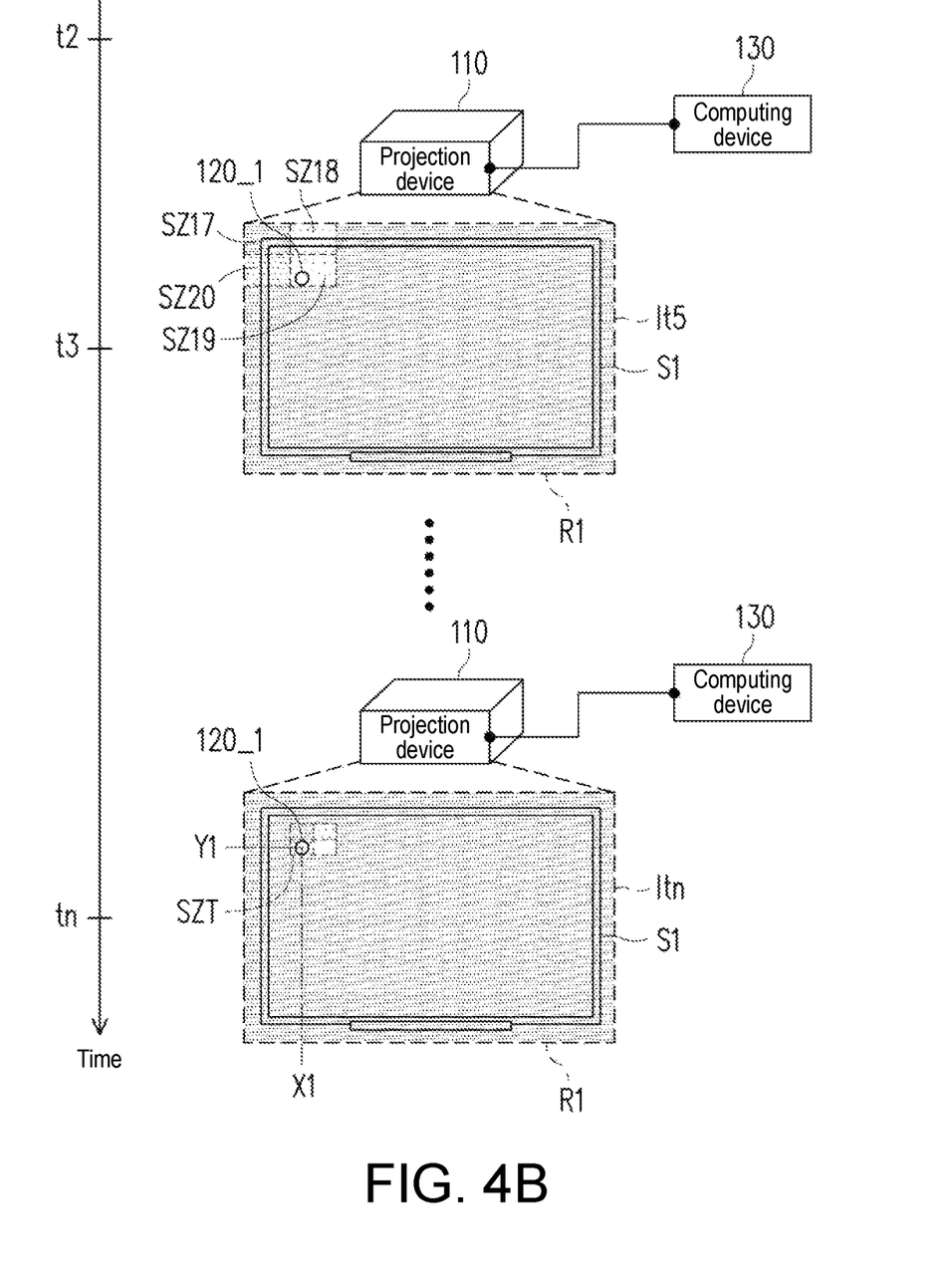

In order to explain the principle of the invention in more detail, FIG. 4A and FIG. 4B are schematic diagrams of a projection positioning method according to an embodiment of the invention. Referring to FIG. 4A and FIG. 4B, in this example, estimation of positioning information of one photosensitive element 120_1 is used as an example for description, but the same principle may be implemented to position a plurality of photosensitive elements. In addition, in FIG. 4A and FIG. 4B, for example, the number of image sub-zones generated during each division is equal to 4 and optical parameters are a black RGB channel value, a red RGB channel value, a green RGB channel value, and a blue RGB channel value. However, the invention is not limited thereto.

Referring to FIG. 4A, a test image It3 may include four image sub-zones SZ9-SZ12 arranged in a matrix, and the image sub-zones SZ9-SZ12 correspond to different RGB channel values and are respectively presented in black, red, green, and blue. In other words, the projection device 110 projects the image sub-zone SZ9 according to an RGB channel value (0, 0, 0); the projection device 110 projects the image sub-zone SZ10 according to an RGB channel value (255, 0, 0); the projection device 110 projects the image sub-zone SZ11 according to an RGB channel value (0, 255, 0); and the projection device 110 projects the image sub-zone SZ12 according to an RGB channel value (0, 0, 255).

When the test image It3 is projected at a time point t1, because the photosensitive element 120_1 is located within the image sub-zone SZ9, the photosensitive element 120_1 may sense an optical parameter (a black RGB channel value) corresponding to the image sub-zone SZ9. Correspondingly, according to a sensing result reported by the photosensitive element 120_1, the computing device 130 may learn that the photosensitive element 120_1 is within coverage of the image sub-zone SZ9. Therefore, the computing device 130 may divide the image sub-zone SZ9 to generate image sub-zones SZ13-SZ16 in a next test image It4. Similarly, the test image It4 may include four image sub-zones SZ13-SZ16 arranged in a matrix, and the image sub-zones SZ13-SZ16 correspond to different RGB channel values and are respectively presented in black, red, green, and blue.

Referring to FIG. 4A and FIG. 4B, when the test image It4 is projected at a time point t2, because the photosensitive element 120_1 is located within the image sub-zone SZ13, the photosensitive element 120_1 may sense an optical parameter (a black RGB channel value) corresponding to the image sub-zone SZ13. Correspondingly, according to a sensing result reported by the photosensitive element 120_1, the computing device 130 may learn that the photosensitive element 120_1 is within coverage of the image sub-zone SZ13. Therefore, the computing device 130 may divide the image sub-zone SZ13 to generate image sub-zones SZ17-SZ20 in a next test image It5. Similarly, the test image It5 may include four image sub-zones SZ17-SZ20 arranged in a matrix, and the image sub-zones SZ17-SZ20 correspond to different RGB channel values and are respectively presented in black, red, green, and blue.

Referring to FIG. 4B, when the test image It5 is projected at a time point t3, because the photosensitive element 120_1 is located within the image sub-zone SZ19, the photosensitive element 120_1 may sense an optical parameter (a green RGB channel value) corresponding to the image sub-zone SZ19. Correspondingly, according to a sensing result reported by the photosensitive element 120_1, the computing device 130 may learn that the photosensitive element 120_1 is within coverage of the image sub-zone SZ19. Therefore, the computing device 130 may divide the image sub-zone SZ19 to generate image sub-zones in a next test image.

Figure 5:
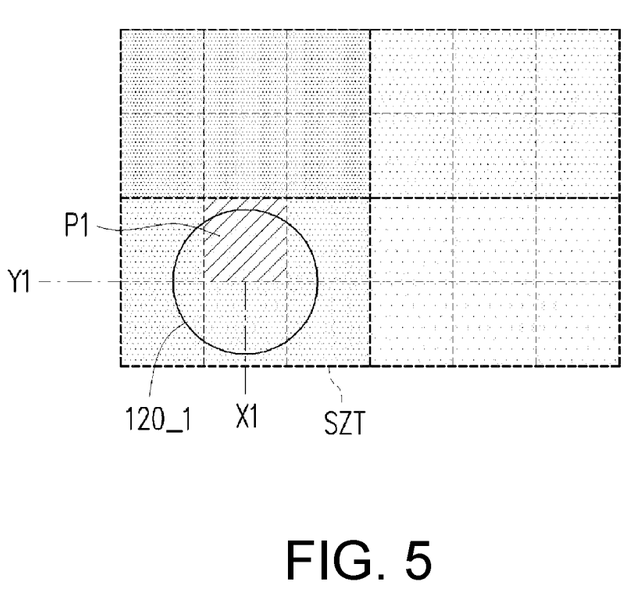
FIG. 5 is an example of positioning a photosensitive element according to an image sub-zone according to an example of FIG. 4.

By analogy, by repeatedly dividing an image sub-zone according to a sensing result and sequentially projecting a plurality of test images, position information of a gradually reduced image sub-zone gradually approaches a true position of a photosensitive element in a projection image. It should be noted that, in this example, the computing device 130 may determine whether a size of an image sub-zone conforms to a minimum division unit, and the minimum division unit may be 3×2 pixels. When a test image Itn is projected at a time point tn, according to a sensing result (a blue RGB channel value) reported by the photosensitive element 120_1, the computing device 130 may learn that the photosensitive element 120_1 is located in coverage of an image sub-zone SZT. In response to determining, by the computing device 130, that a size of the image sub-zone SZT conforms to the minimum division unit (3×2 pixels), the computing device 130 may determine the positioning information of the photosensitive element 120_1 with respect to the projection range R1 according to a pixel position in the image sub-zone SZT. The positioning information may include a first positioning position in a first axial direction (X axis) and a second positioning position in a second axial direction (Y axis), that is, the positioning information of the photosensitive element 120_1 may be pixel coordinates (X1, Y1). For example, referring to FIG. 5, FIG. 5 is an example of positioning a photosensitive element according to an image sub-zone according to an example of FIG. 4. The computing device 130 may obtain the pixel position (X1, Y1) of one pixel P1 in the image sub-zone SZT as the positioning information of the photosensitive element 120_1.

It should be noted that when the projection device 110 performs projection in different environments, a color and brightness presented on the projection screen S1 vary due to the different environments. Therefore, in order to ensure that the computing device 130 can learn of a positioning position of the photosensitive element according to a brightness sensing result or a color sensing result of the photosensitive element, in an embodiment, the projection positioning system 10 may perform a sensing value correction procedure before positioning the position of the photosensitive element. In other words, in an embodiment, the projection device 110 further sequentially projects a plurality of preset correction images respectively corresponding to a plurality of colors. In detail, the projection device 120 may sequentially project a plurality of preset correction images corresponding to different grayscale values, or sequentially project a plurality of preset correction images corresponding to different RGB channel values. The photosensitive elements 120_1-120_4 may sequentially sense a plurality of correction sensing values when the projection device 110 projects the preset correction images, and obtain a sensing correction function according to the correction sensing values. The sensing correction function is used to convert actual sensing values of the photosensitive elements 120_1-120_4 into corresponding optical parameters (the first optical parameter and the second optical parameter), and the sensing correction function may be implemented as a look-up table or a mathematical function, which is not limited in the invention. In other words, the computing device 130 may convert the actual sensing values of the photosensitive elements 120_1-120_4 into the first optical parameter and the second optical parameter according to the sensing correction function, to facilitate subsequent determination of positions of the photosensitive elements 120_1-120_4. In other embodiments, during the sensing value correction procedure, only one photosensitive element 120_1 is required to sense the preset correction images projected by the projection device 110 in sequence and obtain the plurality of correction sensing values, and then the sensing correction function is obtained based on the correction sensing value. The invention does not limit the number of photosensitive elements used for sensing during the sensing value correction procedure.

It can be seen that, through the sensing value correction procedure of the projection positioning system 10, in addition to determining whether the projection range R1 of the projection device 110 covers the photosensitive elements 120_1-120_4, the computing device 130 may convert actual sensing values measured in an actual projection environment into optical parameters corresponding to each image sub-zone. For example, in the examples of FIG. 4A and FIG. 4B, the optical parameters of each image sub-zone respectively correspond to four groups of RGB channel values of black, red, green, and blue. Therefore, in the sensing value correction procedure, the projection device 110 sequentially project four preset correction images corresponding to an RGB channel value (0, 0, 0), an RGB channel value (255, 0, 0), an RGB channel value (0, 255, 0), and an RGB channel value (0, 0, 255). Based on this, when the projection device 110 projects a black preset correction image, the computing device 130 may obtain a correction sensing value V1 corresponding to the RGB channel value (0, 0, 0) according to the correction sensing values sensed by the photosensitive elements 120_1 to 120_4. When the projection device 110 projects a red preset correction image, the computing device 130 may obtain a correction sensing value V2 corresponding to the RGB channel value (255, 0, 0) according to the correction sensing values sensed by the photosensitive elements 120_1 to 120_4. When the projection device 110 projects a green preset correction image, the computing device 130 may obtain a correction sensing value V3 corresponding to the RGB channel value (0, 255, 0) according to the correction sensing values sensed by the photosensitive elements 120_1 to 120_4. When the projection device 110 projects a blue preset correction image, the computing device 130 may obtain a correction sensing value V4 corresponding to the RGB channel value (0, 0, 255) according to the correction sensing values sensed by the photosensitive elements 120_1 to 120_4.

Therefore, the computing device 130 may generate a correction look-up table based on the correction sensing values V1-V4, and determine an optical parameter sensed by the photosensitive element in a positioning process according to the correction look-up table. Through the sensing value correction procedure of the projection positioning system 10, the projection device 110 can accurately perform the projection positioning method in different environments.

In view of the above, in the embodiment of the invention, because the user does not need to manually correct a projection image and does not need to consider a camera parameter and camera correction, a more convenient and fast projection positioning method is provided. By gradually dividing an image sub-zone and using the photosensitive element to sense the optical parameter, the positioning information of the photosensitive element can be accurately obtained, thereby further improving the display quality and the use convenience of the projection device. Furthermore, other objectives and advantages of the invention may further be learned from technical features disclosed in the invention.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection positioning system, comprising:
   a projection device, configured to project a first test image and a second test image on a projection screen based on a projection range at different time points;
   at least one photosensitive element, disposed on the projection screen; and
   a computing device, coupled to the at least one photosensitive element and the projection device, wherein
   the first test image comprises a plurality of first image sub-zones and the first image sub-zones respectively correspond to a plurality of first optical parameters, and the second test image comprises a plurality of second image sub-zones and the second image sub-zones respectively correspond to a plurality of second optical parameters;
   in response to projecting the first test image by the projection device, the computing device divides the first image sub-zone according to the first image sub-zone corresponding to one of the first optical parameters sensed by the at least one photosensitive element, to generate the second test image; and
   in response to projecting the second test image by the projection device, the computing device determines positioning information of the at least one photosensitive element with respect to the projection range according to the second image sub-zone corresponding to one of the second optical parameters sensed by the at least one photosensitive element, and the projection device performs a projection adjustment function according to the positioning information.

2. The projection positioning system according to claim 1, wherein the projection adjustment function performed by the projection device according to the positioning information of the at least one photosensitive element is to perform projection within a specific enclosed range surrounded by the at least one photosensitive element on the projection screen, and the number of the at least one photosensitive element is greater than 1.

3. The projection positioning system according to claim 1, wherein the projection adjustment function performed by the projection device according to the positioning information of the at least one photosensitive element is to project a specific totem on a position of the at least one photosensitive element.

4. The projection positioning system according to claim 1, wherein sizes of the second image sub-zones are smaller than sizes of the first image sub-zone.

5. The projection positioning system according to claim 4, wherein in response to determining, by the computing device, that the sizes of the second image sub-zones conform to a minimum division unit, the computing device determines the positioning information of the at least one photosensitive element with respect to the projection range.

6. The projection positioning system according to claim 1, wherein the first image sub-zones and the second image sub-zones are respectively arranged in a matrix, and the positioning information comprises a first positioning position in a first axial direction and a second positioning position in a second axial direction.

7. The projection positioning system according to claim 1, wherein the first optical parameters and the second optical parameters comprise a color sensing value or a brightness sensing value, and the at least one photosensitive element comprises a color sensor or a brightness sensor.

8. The projection positioning system according to claim 1, wherein in response to projecting the first test image by the projection device, one of the first image sub-zones overlaps the at least one photosensitive element, and the at least one photosensitive element senses one of the first optical parameters corresponding to one of the first image sub-zones.

9. The projection positioning system according to claim 1, wherein in response to projecting the second test image by the projection device, one of the second image sub-zones overlaps the at least one photosensitive element, the at least one photosensitive element senses one of the second optical parameters corresponding to one of the second image sub-zones, and the computing device determines the positioning information of the at least one photosensitive element with respect to the projection range according to position information of one of the second image sub-zones in the second test image.

10. The projection positioning system according to claim 1, wherein the projection device further projects a plurality of preset correction images respectively corresponding to a plurality of colors, and the at least one photosensitive element sequentially senses a plurality of correction sensing values when the projection device is projecting the preset correction images, and obtains a sensing correction function according to the correction sensing values, wherein the sensing correction function is configured to convert actual sensing values of the at least one photosensitive element into the first optical parameters and the second optical parameters.

11. A projection positioning method, comprising:
projecting, by a projection device, a first test image on a projection screen based on a projection range, wherein the first test image comprises a plurality of first image sub-zones and the first image sub-zones respectively correspond to a plurality of first optical parameters;
dividing, in response to projecting the first test image by the projection device, the first image sub-zone according to the first image sub-zone corresponding to one of the first optical parameters sensed by at least one photosensitive element, to generate a second test image;
projecting, by the projection device, the second test image on the projection screen based on the projection range, wherein the projection device projects the first test image and the second test image at different time points, and the second test image comprises a plurality of second image sub-zones and the second image sub-zones respectively correspond to a plurality of second optical parameters;
determining, in response to projecting the second test image by the projection device, positioning information of the at least one photosensitive element with respect to the projection range according to the second image sub-zone corresponding to one of the second optical parameters sensed by the at least one photosensitive element; and
performing a projection adjustment function according to the positioning information.

12. The projection positioning method according to claim 11, wherein the step of performing the projection adjustment function according to the positioning information comprises:
performing, by the projection device according to the positioning information of the at least one photosensitive element, projection within a specific enclosed range surrounded by the at least one photosensitive element on the projection screen, wherein the number of the at least one photosensitive element is greater than 1.

13. The projection positioning method according to claim 11, wherein the step of performing the projection adjustment function according to the positioning information comprises:
projecting, by the projection device, a specific totem on a position of the at least one photosensitive element according to the positioning information of the at least one photosensitive element.

14. The projection positioning method according to claim 11, wherein sizes of the second image sub-zones are smaller than sizes of the first image sub-zone.

15. The projection positioning method according to claim 14, wherein the step of determining, in response to projecting the second test image by the projection device, the positioning information of the at least one photosensitive element with respect to the projection range according to the second image sub-zone corresponding to one of the second optical parameters sensed by the at least one photosensitive element comprises:
determining, in response to determining that the sizes of the second image sub-zones conform to a minimum division unit, the positioning information of the at least one photosensitive element with respect to the projection range.

16. The projection positioning method according to claim 11, wherein the first image sub-zones and the second image sub-zones are respectively arranged in a matrix, and the positioning information comprises a first positioning position in a first axial direction and a second positioning position in a second axial direction.

17. The projection positioning method according to claim 11, wherein the first optical parameters and the second optical parameters comprise a color sensing value or a brightness sensing value, and the at least one photosensitive element comprises a color sensor or a brightness sensor.

18. The projection positioning method according to claim 11, wherein in response to projecting the first test image by the projection device, one of the first image sub-zones overlaps the at least one photosensitive element, and the at least one photosensitive element senses one of the first optical parameters corresponding to one of the first image sub-zones.

19. The projection positioning method according to claim 11, wherein in response to projecting the second test image by the projection device, one of the second image sub-zones overlaps the at least one photosensitive element, and the at least one photosensitive element senses one of the second optical parameters corresponding to one of the second image sub-zones; and
the step of determining the positioning information of the at least one photosensitive element with respect to the projection range comprises:
determining the positioning information of the at least one photosensitive element with respect to the projection range according to position information of one of the second image sub-zones in the second test image.

20. The projection positioning method according to claim 11, further comprising:
projecting, by the projection device, a plurality of preset correction images respectively corresponding to a plurality of colors; and
sequentially sensing, by the at least one photosensitive element, a plurality of correction sensing values when the preset correction images are being projected, to obtain a sensing correction function according to the correction sensing values, wherein the sensing correction function is configured to convert actual sensing values of the at least one photosensitive element into the first optical parameters and the second optical parameters.

* * * * *